(12) United States Patent
Takemoto et al.

(10) Patent No.: US 10,931,153 B2
(45) Date of Patent: Feb. 23, 2021

(54) WIRELESS ELECTRICITY TRANSMISSION SYSTEM

(71) Applicant: AISIN SEIKI KABUSHIKI KAISHA, Kariya (JP)

(72) Inventors: Atsushi Takemoto, Ota-ku (JP); Yusuke Shiratori, Urayasu (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 118 days.

(21) Appl. No.: 16/197,705

(22) Filed: Nov. 21, 2018

(65) Prior Publication Data

US 2019/0157916 A1 May 23, 2019

(30) Foreign Application Priority Data

Nov. 22, 2017 (JP) .............................. JP2017-224743

(51) Int. Cl.
*H02J 50/90* (2016.01)
*H02J 50/40* (2016.01)
(Continued)

(52) U.S. Cl.
CPC ............ *H02J 50/90* (2016.02); *B60R 16/027* (2013.01); *H02J 7/025* (2013.01); *H02J 50/20* (2016.02);
(Continued)

(58) Field of Classification Search
CPC .. H02J 50/12; H02J 50/20; H02J 50/40; H02J 50/80; H02J 50/90; H02J 7/025; B60L 11/182
(Continued)

(56) References Cited

U.S. PATENT DOCUMENTS

2016/0049824 A1\* 2/2016 Stein ....................... H02J 50/20
320/108
2018/0006508 A1 1/2018 Ueki et al.
(Continued)

FOREIGN PATENT DOCUMENTS

JP 08-103039 A 4/1996
JP 2009-292230 A 12/2009
(Continued)

*Primary Examiner* — Paul Dinh
(74) *Attorney, Agent, or Firm* — Sughrue Mion, PLLC

(57) ABSTRACT

A wireless electricity transmission system includes: a wireless electricity transmission device and one or more wireless electricity reception devices installed within a vehicle. The wireless electricity transmission device includes an electricity transmission wave generation unit that generates a directional electricity transmission wave using beamforming, and a control unit that transmits query waves in directions and, when a pilot signal including identification information on a query wave having a maximum reception strength is received from the wireless electricity reception device, transmits the electricity transmission wave to the wireless electricity reception device in a direction of the query wave. The wireless electricity reception device includes a reception strength determination unit that determines the query wave having the maximum reception strength, a control unit that transmits the pilot signal including the identification information on the query wave having the maximum reception strength, and a reception unit that receives the electricity transmission wave.

5 Claims, 7 Drawing Sheets

(51) Int. Cl.
  *H02J 50/20*    (2016.01)
  *H02J 7/02*    (2016.01)
  *B60R 16/027*    (2006.01)
  *B60R 16/03*    (2006.01)
  *B60L 1/00*    (2006.01)

(52) U.S. Cl.
  CPC ............... *H02J 50/40* (2016.02); *B60L 1/00* (2013.01); *B60R 16/03* (2013.01)

(58) Field of Classification Search
  USPC ........................................................ 320/108
  See application file for complete search history.

(56) References Cited

U.S. PATENT DOCUMENTS

2018/0375381 A1* 12/2018 Nakano ................... H02J 50/12
2019/0312465 A1* 10/2019 Yeo .......................... H02J 50/80

FOREIGN PATENT DOCUMENTS

| JP | 2013-162609 A | 8/2013 |
| WO | 2016/129450 A1 | 8/2016 |

* cited by examiner

WIRELESS ELECTRICITY TRANSMISSION SYSTEM

CROSS REFERENCE TO RELATED APPLICATIONS

This application is based on and claims priority under 35 U.S.C. § 119 to Japanese Patent Application 2017-224743, filed on Nov. 22, 2017, the entire contents of which are incorporated herein by reference.

TECHNICAL FIELD

This disclosure relates to a wireless electricity transmission system.

BACKGROUND DISCUSSION

Many electrical components (a sensor, an Electronic Control Unit (ECU), a motor, and the like) that operate on electric power are installed in a vehicle in the related art.

Thus, a need exists for an electricity transmission system for the electric component within the vehicle.

SUMMARY

A wireless electricity transmission system according to an aspect of this disclosure is a wireless electricity transmission system that includes a wireless electricity transmission device and one or more wireless electricity reception devices, which are installed within a vehicle. The wireless electricity transmission device includes an electricity transmission wave generation unit that generates an electricity transmission wave that is directional, using beamforming, and a control unit that transmits a plurality of query waves in a plurality of directions within the vehicle and, when a pilot signal that includes identification information on a query wave that has a maximum reception strength is received from the wireless electricity reception device, transmits the electricity transmission wave to the wireless electricity reception device in a direction of the query wave that has the maximum reception strength using the electricity transmission wave generation unit. The wireless electricity reception device includes a reception strength determination unit that determines the query wave which has the maximum reception strength, among the plurality of query waves that are received from the wireless electricity transmission device, a control unit that transmits the pilot signal which includes the identification information on the query wave that has the maximum reception strength which is determined by the reception strength determination unit, to the wireless electricity transmission device, and a reception unit that receives the electricity transmission wave that is transmitted from the wireless electricity transmission device.

A wireless electricity transmission system according to another aspect of this disclosure is a wireless electricity transmission system that includes a wireless electricity transmission device and one or more wireless electricity reception devices, which are installed within a vehicle. The wireless electricity reception device includes a control unit that transmits a pilot signal that includes identification information on the wireless electricity reception device itself, to the wireless electricity transmission device and a reception unit that receives an electricity transmission wave which is transmitted from the wireless electricity transmission device. The wireless electricity transmission device includes a plurality of antennas that receive the pilot signal which is transmitted from the wireless electricity reception device, an electricity transmission wave generation unit that generates the electricity transmission wave that is directional, using beamforming, and a control unit that calculates a direction of the wireless electricity reception device based on the pilot signal that is received by each of the plurality of antennas and on a predetermined arrival direction estimation algorithm, and transmits the electricity transmission wave to the wireless electricity reception device in the calculated direction using the electricity transmission wave generation unit.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Exemplary embodiments (a first embodiment and a second embodiment) will be disclosed below. A configuration of the embodiment that will be disclosed and an operation, a result, and an effect that are brought about by the configuration are examples. It is also possible that the embodiments disclosed here are realized by other than the configuration that will be disclosed in the following embodiment, and it is possible that at least one among various effects that are based on a basic configuration or among derivative effects are obtained.

First Embodiment

Figure 1:
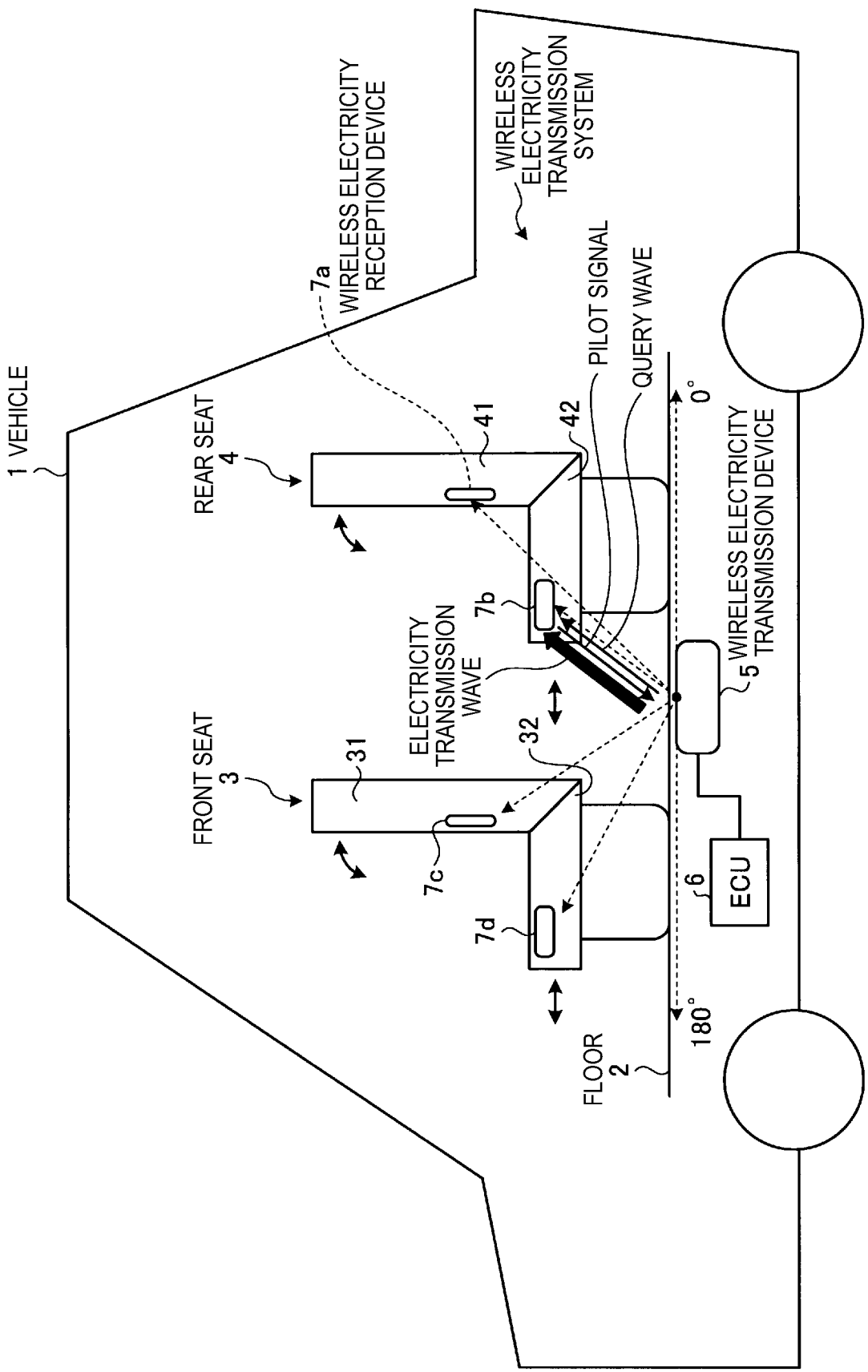
FIG. 1 is a schematic diagram of a vehicle in which a wireless electricity transmission system according to a first embodiment is installed.

First, a wireless electricity transmission system according to the first embodiment is described. FIG. 1 is a schematic diagram of a vehicle (a passenger car or the like) 1 in which the wireless electricity transmission system according to the first embodiment is installed. The wireless electricity transmission system is configured with a wireless electricity transmission device 5 that is installed with the vehicle 1, and one or more wireless electricity reception devices 7 (7a, 7b, 7c, and 7d) (four wireless electricity reception devices in the present embodiment).

The wireless electricity transmission device 5 is installed underneath a floor 2 of the vehicle 1. Furthermore, a front seat 3 (a movable portion) and a rear seat 4 (a movable portion) are provided on the floor 2. The rear seat 4 has a rear-seat back surface portion 41 and a rear-seat seat surface portion 42. The wireless electricity reception device 7a is embedded in the rear-seat back surface portion 41. The wireless electricity reception device 7b is embedded in the rear-seat seat surface portion 42.

The front seat 3 includes a front-seat back surface portion 31 and a front-seat seat surface portion 32. The wireless electricity reception device 7c is embedded in the front-seat back surface portion 31. The wireless electricity reception device 7d is embedded in the front-seat seat surface portion 32. The wireless electricity reception devices 7a, 7b, 7c, and 7d, when not distinguished from each other, are hereinafter referred to as the wireless electricity reception device 7.

An Electronic Control Unit (ECU) 6 is connected to the wireless electricity transmission device 5. The ECU 6, for example, has a Central Processing Unit (CPU), a Read Only Memory (ROM), a Random Access Memory (RAM), a Solid State Drive (SDD), and the like. The CPU executes various arithmetic processing operations, such as image processing, and various controls, such as controls of the vehicle 1. The CPU reads a program that is installed and stored in a nonvolatile memory device, such as the ROM, and performs an arithmetic processing operation according to the program. Various pieces of data that are used for arithmetic operations in the CPU are temporarily stored in the RAM. The SSD is a rewritable nonvolatile memory unit. Even in a case where the ECU 6 is powered off, data can be stored in the SSD.

Next, an outline of an operation in the wireless electricity transmission system will be described. The wireless electricity transmission device 5 transmits an electricity transmission wave for supplying electric power to the wireless electricity reception devices 7, but before that time, transmits a query wave into the vehicle 1 while causing a shift in a stepwise manner (for example, by 5° at a time) in order to search for a direction of each of the wireless electricity reception devices 7. It is noted that, with reference to FIG. 1, the query wave is described as being transmitted into the vehicle 1 while being shifted one-dimensionally counter-clockwise from the right side (0°) of FIG. 1 to the left side (180°) of FIG. 1 in a stepwise manner. In practice, this one-dimensional shift is performed multiple times while the shift is performed in a direction, such as one vertical to this one-dimensional direction, and thus the query wave is shifted two-dimensionally. However, in the following, a description of a two-dimensional shift is omitted. It is noted that the query wave is transmitted in a certain direction, but is spread, as a spherical wave, into space because the query wave is not particularly directional.

Then, for example, the wireless electricity reception device 7a sequentially receives these query waves, but reception strength of the query wave varies according to a direction of the query wave. The wireless electricity reception device 7a calculates the reception strength of every query wave, and transmits a pilot signal, which includes an identification number of a query wave with maximum reception strength, to the wireless electricity transmission device 5. When this is done, the wireless electricity transmission device 5 specifies a direction of the wireless electricity reception device 7a from the identification number of the query wave with the maximum reception strength in the pilot signal that is received from the wireless electricity reception device 7a. Then, a directional electricity transmission wave is transmitted in a direction from the wireless electricity transmission device 5 to the wireless electricity reception device 7a, and thus the wireless electricity reception device 7a can be efficiently charged. The same is also true for the wireless electricity reception devices 7b, 7c, and 7d.

It is noted that the pilot signal refers to a signal other than a signal that is simple and formal, such as an activation completion signal, among signals that are transmitted from the wireless electricity reception device 7 to the wireless electricity transmission device 5.

Figure 2:
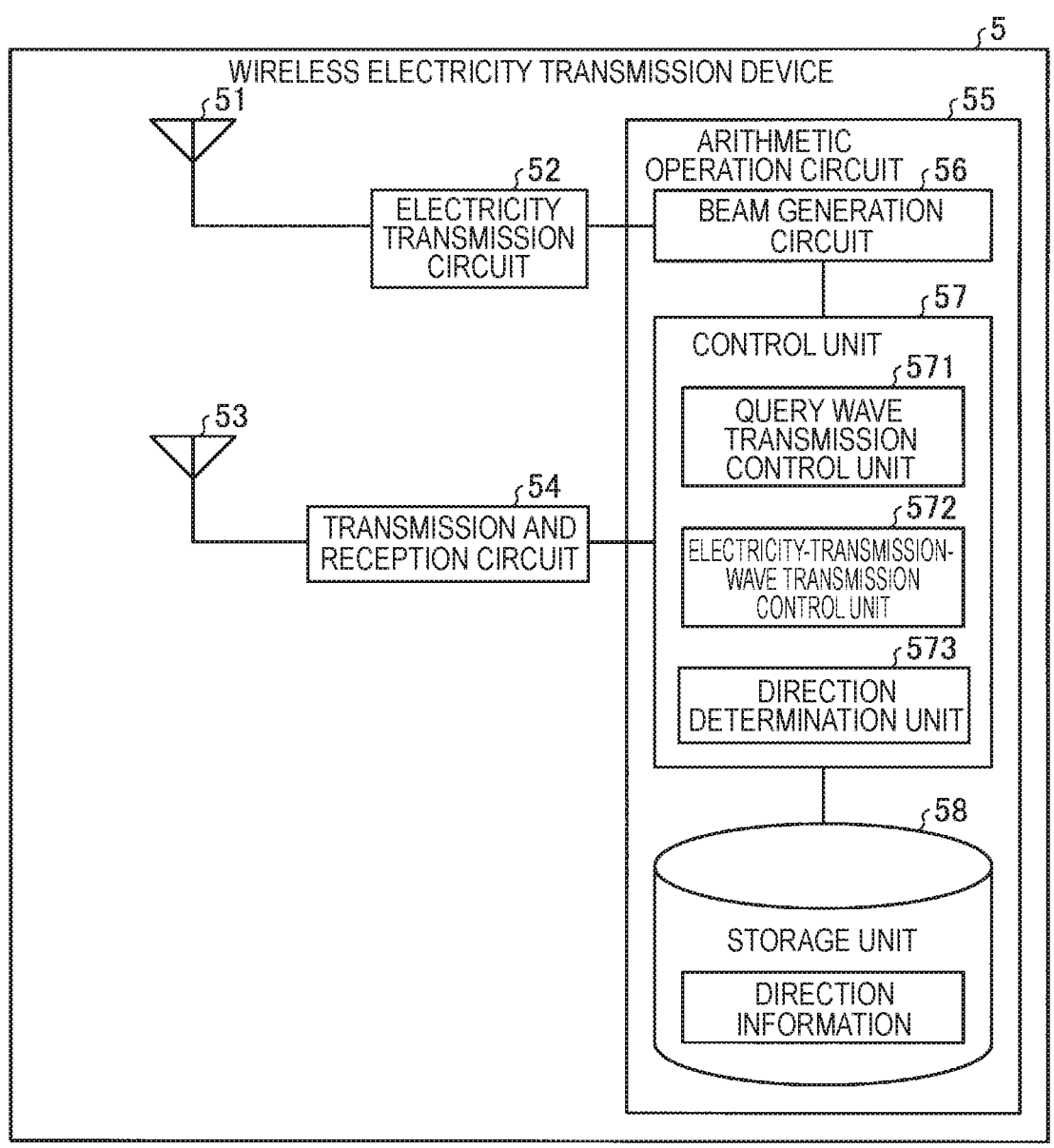
FIG. 2 is a diagram of a configuration of a wireless electricity transmission device according to the first embodiment.

Next, the wireless electricity transmission device 5 will be described with reference to FIG. 2. FIG. 2 is a diagram of a configuration of the wireless electricity transmission device 5 according to the first embodiment. The wireless electricity transmission device 5 includes an antenna 51, an electricity transmission circuit 52, an antenna 53, a transmission and reception circuit 54, and an arithmetic operation circuit 55.

The antenna 51 and the electricity transmission circuit 52 are units for transmitting the electricity transmission wave to the wireless electricity reception device 7.

The antenna 53 and the transmission and reception circuit 54 are units for performing communication (query wave transmission, pilot signal reception, or the like) with the wireless electricity reception device 7.

The arithmetic operation circuit 55 includes a beam generation circuit 56 (an electricity transmission wave generation unit), a control unit 57, and a storage unit 58. The beam generation circuit 56 generates a directional electricity transmission wave with beamforming using the electricity transmission circuit 52, and transmits the generated directional electricity transmission wave from the antenna 51 to the wireless electricity reception device 7. A beamforming function, for example, can be realized by an adaptive array antenna, but, without being limited to this, may be realized using any other method such as mechanical rotation by a directional antenna.

The control unit 57 includes a query wave transmission control unit 571, an electricity transmission wave transmission control unit 572, and a direction determination unit 573. It is noted that in the following, an entity, which performs operations other than operations by the query wave transmission control unit 571, the electricity transmission wave transmission control unit 572, and the direction determination unit 573 in the control unit 57, is expressed as the "control unit 57".

The query wave transmission control unit 571 transmits the query wave in multiple directions within the vehicle 1. For example, in order to search for the direction of the wireless electricity reception device 7, the query wave transmission control unit 571 generates the query wave using the transmission and reception circuit 54, and performs control that transmits the generated query wave from the antenna 53 into the vehicle 1 while shifting the generated query wave in a stepwise manner (for example, by 5° at a time).

In a case where the direction determination unit 573 receives the pilot signal that includes identification information on the query wave that has the maximum reception strength, from the wireless electricity reception device 7, the direction determination unit 573 determines the direction of the query wave as the direction of the wireless electricity reception device 7. The direction that is determined by the direction determination unit 573 is stored, as direction information, in the storage unit 58. More precisely, the direction information that is stored in the storage unit 58 is information that results from associating the identification information on, and the direction, of the wireless electricity reception device 7 with each other. Furthermore, data necessary for the operation by the control unit 57, or data that is obtained by the operation by the control unit 57 is stored in the storage unit 58.

When transmitting the electricity transmission wave to the wireless electricity reception device 7, the electricity transmission wave transmission control unit 572 performs control in such a manner that the directional electricity transmission wave, which is generated by the beam generation circuit 56, is transmitted in the direction that is determined by the direction determination unit 573.

Figure 3:
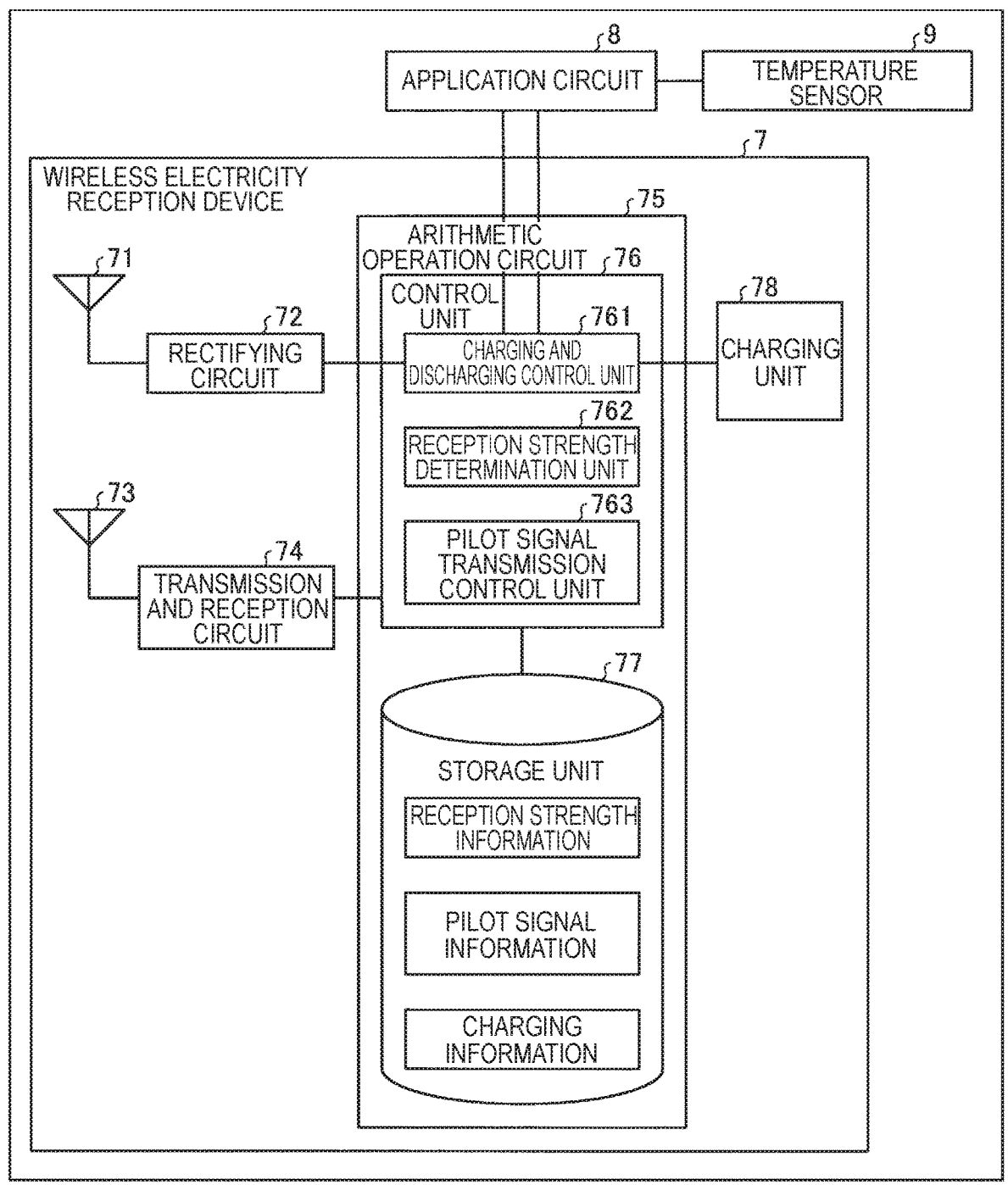
FIG. 3 is a diagram of a configuration of a wireless electricity reception device according to the first embodiment.

Next, the wireless electricity reception device 7 will be described with reference to FIG. 3. FIG. 3 is a diagram of a configuration of the wireless electricity reception device 7 according to the first embodiment. The wireless electricity reception device 7 includes an antenna 71 (a reception unit), a rectifying circuit 72, an antenna 73, a transmission and reception circuit 74, an arithmetic operation circuit 75, and a charging unit 78.

The antenna 71 and the rectifying circuit 72 are units that receive the electricity transmission wave (at a high frequency) that is transmitted from the wireless electricity transmission device 5 and convert (rectify) the received electricity transmission wave into a direct current.

The antenna 73 and the transmission and reception circuit 74 are units for performing communication (query wave reception, pilot signal transmission, or the like) with the wireless electricity transmission device 5.

The arithmetic operation circuit 75 includes a control unit 76 and a storage unit 77. The control unit 76 includes a charging and discharging control unit 761, a reception strength determination unit 762, and a pilot signal transmission control unit 763. It is noted that in the following, an entity, which performs operations other than operations by the charging and discharging control unit 761, the reception strength determination unit 762, and the pilot signal transmission control unit 763 in the control unit 76, is expressed as the "control unit 76".

The charging and discharging control unit 761 performs control that charges the charging unit 78 with a direct current that results from rectification by the rectifying circuit 72, or that provides an electric power with which the charging unit 78 is charged, to an application circuit 8.

The reception strength determination unit 762 calculates the reception strength of each of the plurality of query waves that are received from the wireless electricity transmission device 5, and determines the query wave that has the maximum reception strength, from the plurality of query waves. The identification information on the query wave that has the maximum reception strength that is determined by the reception strength determination unit 762 is stored, as reception strength information, in the storage unit 77.

The pilot signal transmission control unit 763 generates the pilot signal using the transmission and reception circuit 74, based on the reception strength information or pilot signal information that is stored in the storage unit 77, and performs control that transmits the generated pilot signal from the antenna 73 to the wireless electricity transmission device 5. At this point, the pilot signal information, for example, is identification information or positional information on the wireless electricity reception device 7 itself, sensor information (attribute information) that is detected by a temperature sensor 9, or the like. For example, the pilot signal transmission control unit 763 generates the pilot signal that includes the identification information on the query wave that has the maximum reception strength, and transmits the generated pilot signal from the antenna 73 to the wireless electricity transmission device 5.

The charging unit 78 is a unit that performs charging or discharging according to an instruction from the charging and discharging control unit 761, and, for example, can be realized by a storage battery or a capacitor. Information (an amount of charged electricity, an amount of discharged electricity, or an amount of remaining charged electricity during every time span) relating to the charging of the charging unit 78 is stored, as charging information, in the storage unit 77. Furthermore, data necessary for the operation by the control unit 76, or data that is obtained by the operation by the control unit 76 is stored in the storage unit 77.

Furthermore, the application circuit 8, as illustrated, is connected to the wireless electricity reception device 7 by two lines, an electric power line and a data communication line. The temperature sensor 9 is an example of a sensor that is installed within the vehicle 1, and outputs detected-temperature information as a sensor signal. The control unit 76 stores sensor information that is received from the temperature sensor 9 via the application circuit 8, as the pilot signal information, in the storage unit 77. Furthermore, the application circuit 8 plays a role in relaying an electric power in a case where a power (electric power) is supplied to the temperature sensor 9 based on the sensor signal from the temperature sensor 9 and an instruction by the charging and discharging control unit 761. It is noted that according to a specification, the application circuit 8 may be provided within the wireless electricity reception device 7.

It is noted that in FIG. 3, a case of the temperature sensor 9 that is an example of the sensor which is a target for electric power supply from the wireless electricity reception device 7 is illustrated, but that, without being limited to this, the target for electric power supply may be any other sensor, an ECU (separate from the ECU 6), a motor, or the like.

Figure 4:
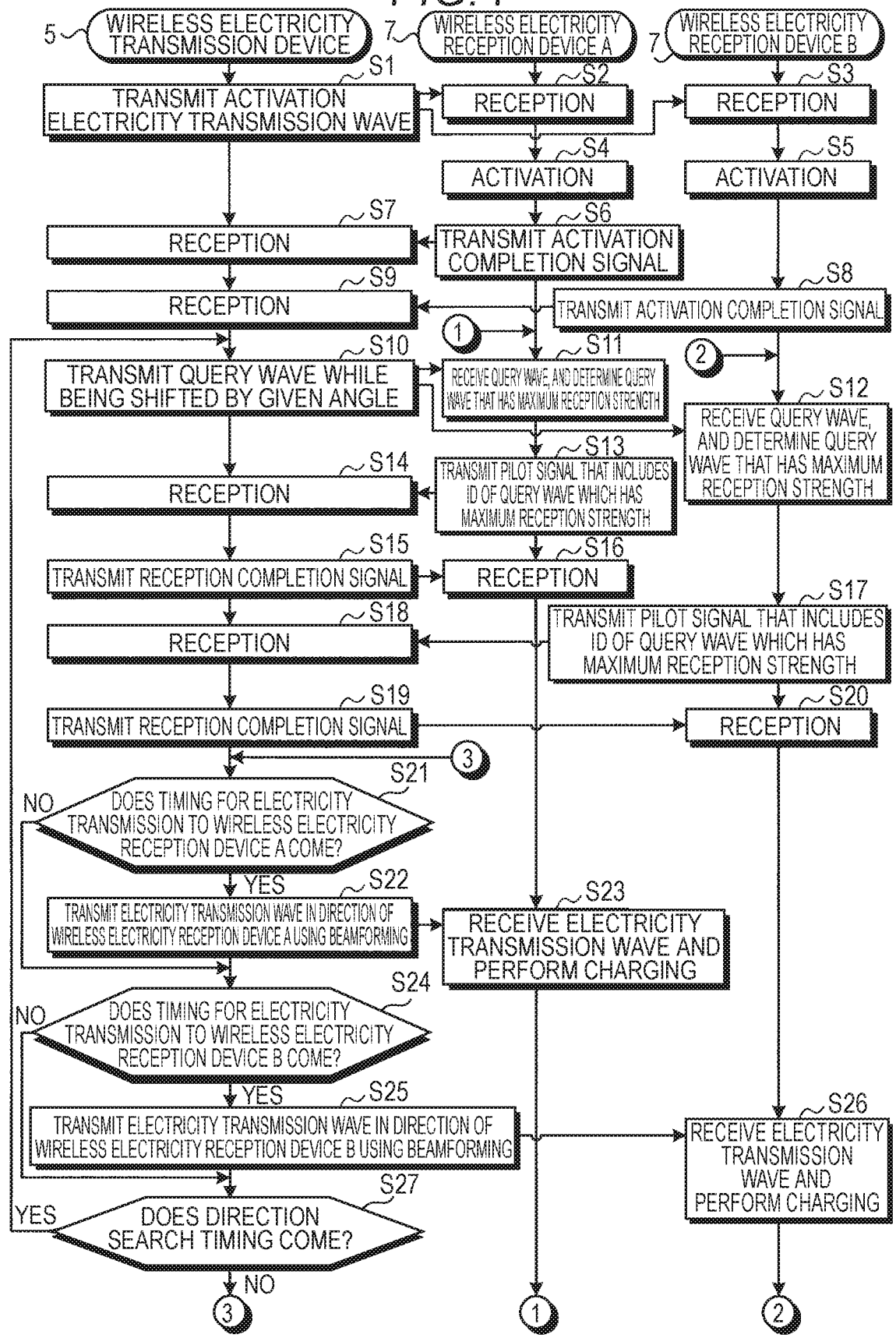
FIG. 4 is a flowchart illustrating processing by the wireless electricity transmission system according to the first embodiment.

Next, processing by the wireless electricity transmission system will be described with reference to FIG. 4. FIG. 4 is a flowchart illustrating the processing by the wireless electricity transmission system according to the first embodiment. It is noted that in order to simplify the description or illustration in FIG. 4, two wireless electricity reception devices, a "wireless electricity reception device A" and a "wireless electricity reception device B" are present as the wireless electricity reception device 7.

First, the control unit 57 of the wireless electricity transmission device 5 transmits an activation electricity transmission wave from the antenna 51 into the vehicle 1 using the electricity transmission circuit 52 (Step S1), and the wireless electricity reception devices A and B receive the activation electricity transmission wave (Steps S2 and S3). It is noted that the activation electricity transmission wave is a non-directional electricity transmission wave, but that the non-directivity does not pose any problem because any minute amount of electric power for activation is sufficiently caused to occur in the wireless electricity reception devices A and B.

Subsequent to Step S2, the wireless electricity reception device A is activated (Step S4), and the control unit 76 generates an activation completion signal using the transmission and reception circuit 74 and transmits the generated activation completion signal from the antenna 73 to the wireless electricity transmission device 5 (Step S6). The wireless electricity transmission device 5 receives the activation completion signal (Step S7).

In the same manner, subsequent to Step S3, the wireless electricity reception device B is activated (Step S5), and the control unit 76 generates an activation completion signal using the transmission and reception circuit 74 and transmits the generated activation completion signal from the antenna 73 to the wireless electricity transmission device 5 (Step S8). The wireless electricity transmission device 5 receives the activation completion signal (Step S9).

Subsequent to Step S9, in order to search for directions of the wireless electricity reception devices A and B, the query wave transmission control unit 571 of the wireless electricity transmission device 5 generates the query wave using the transmission and reception circuit 54, and transmits the generated query wave from the antenna 53 into the vehicle 1 while shifting the generated query wave in a stepwise manner (for example, by 5° at a time) (Step S10).

Subsequently, in Step S11, the wireless electricity reception device A sequentially receives a plurality of query waves that are transmitted from the wireless electricity transmission device 5 by the antenna 73, and the reception strength determination unit 762 determines a query wave that has the maximum reception strength among the plurality of query waves.

Subsequent to Step S11, the pilot signal transmission control unit 763 of the wireless electricity reception device A generates a pilot signal that includes an ID (identification information on the query wave) of the query wave that has the maximum reception strength, and transmits the generated pilot signal from the antenna 73 to the wireless electricity transmission device 5 (Step S13). The wireless electricity transmission device 5 receives the pilot signal (Step S14), and the control unit 57 transmits a reception completion signal to the wireless electricity reception device A (Step S15). The wireless electricity reception device A receives the reception completion signal (Step S16). It is noted that the sensor information which is detected by the sensor such as the temperature sensor 9 may be included, as the attribute information, in the pilot signal that is transmitted in Step S13.

In the same manner, in Step S12, the wireless electricity reception device B sequentially receives a plurality of query waves that are transmitted from the wireless electricity transmission device 5 by the antenna 73, and the reception strength determination unit 762 determines a query wave that has the maximum reception strength among the plurality of query waves.

Subsequent to Step S12, the pilot signal transmission control unit 763 of the wireless electricity reception device B generates a pilot signal that includes an ID (identification information on the query wave) of the query wave that has the maximum reception strength, and transmits the generated pilot signal from the antenna 73 to the wireless electricity transmission device 5 (Step S17). The wireless electricity transmission device 5 receives the pilot signal (Step S18), and the control unit 57 transmits the reception completion signal to the wireless electricity reception device B (Step S19). The wireless electricity reception device B receives the reception completion signal (Step S20).

Next, in Step S21, the control unit 57 of the wireless electricity transmission device 5 determines whether or not a timing for electricity transmission to the wireless electricity reception device A comes. The control unit 57 proceeds to Step S22 in a case where the result is Yes, and proceeds to Step S24 in a case where the result is No. It is noted that the timing for electricity transmission to the wireless electricity reception device A is determined according to specifications for, or a usage situation of, an electrical component (a sensor, an ECU, or a motor) which is connected to the wireless electricity reception device A (the same is also true for the wireless electricity reception device B).

In step S22, the wireless electricity transmission device 5 transmits the electricity transmission wave using the beamforming in the direction of the wireless electricity reception device A. More precisely, when transmitting the electricity transmission wave to the wireless electricity reception device A, the electricity transmission wave transmission control unit 572 of the wireless electricity transmission device 5 transmits the directional electricity transmission wave, which is generated by the beam generation circuit 56, in a direction of the query wave that has the maximum reception strength that is included in the pilot signal from the wireless electricity reception device A. Then, in the wireless electricity reception device A, the antenna 71 receives the electricity transmission wave, the rectifying circuit 72 rectifies the electricity transmission wave, and the charging and discharging control unit 761 charges the charging unit 78 with a direct current that results from the rectification (Step S23). Subsequent to Step S23, returning to Step S11 takes place. However, after the returning to Step S11 takes place, Step S23 may be performed without performing Steps S11, S13, and S16.

In Step S24, the control unit 57 of the wireless electricity transmission device 5 determines whether or not a timing for electricity transmission to the wireless electricity reception device B comes. The control unit 57 proceeds to Step S25 in the case where the result is Yes, and proceeds to Step S27 in the case where the result is No.

In step S25, the wireless electricity transmission device 5 transmits the electricity transmission wave using the beamforming in the direction of the wireless electricity reception device B. More precisely, when transmitting the electricity transmission wave to the wireless electricity reception device B, the electricity transmission wave transmission control unit 572 of the wireless electricity transmission device 5 transmits the directional electricity transmission wave, which is generated by the beam generation circuit 56, in a direction of the query wave that has the maximum reception strength that is included in the pilot signal from the wireless electricity reception device B. Then, in the wireless electricity reception device B, the antenna 71 receives the electricity transmission wave, the rectifying circuit 72 rectifies the electricity transmission wave, and the charging and discharging control unit 761 charges the charging unit 78 with the direct current that results from the rectification (Step S26). Subsequent to Step S26, returning to Step S12 takes place. However, after the returning to Step S12 takes place, Step S26 may be performed without performing Steps S12, S17, and S20.

In Step S27, the control unit 57 of the wireless electricity transmission device 5 determines whether or not a direction search timing comes. The control unit 57 returns to Step S10 in the case where the result is Yes, and returns to Step S21 in the case where the result is No. As the direction search timing, for example, a user may set any timing, such as a predetermined point in time every 30 minutes, a predetermined point in time every day, or a point in time immediately after an occupant get out of the vehicle 1.

In this manner, in the wireless electricity transmission system according to the first embodiment, an electric power can be supplied to an electric component within the vehicle 1 with ease and with high efficiency. For example, the wireless electricity transmission device 5 transmits the directional electricity transmission wave in the direction of the query wave that has the maximum reception strength which is information that is included in the pilot signal which is received from the wireless electricity reception device 7, to each of the wireless electricity reception devices 7, and thus an electric power can be supplied to each of the wireless electricity reception devices 7 with ease and with high efficiency.

Furthermore, for example, the wireless electricity reception device 7 can transmit the sensor information that is detected by the sensor, such as the temperature sensor 9, that is connected to the wireless electricity reception device 7 itself, to the wireless electricity transmission device 5, in a state of being included as the attribute information in the pilot signal. Because of this, processing can be efficiently realized. More precisely, the wireless electricity reception device 7 can be caused to perform an operation for a Radio Frequency Identification (RFID) tag in the related art.

Furthermore, even in a case where the movable portion (the front seat 3 or the rear seat 4), in which the wireless electricity reception device 7 is installed, moves, the electricity transmission wave can be transmitted in an accurate direction from the wireless electricity transmission device 5 to the wireless electricity reception device 7. For example, in a case where the electric power is supplied to the wireless electricity reception device 7 after the movable portion moves, it is recognized that the direction search timing comes (Yes in Step S27), and thus the wireless electricity transmission device 5 may necessarily search for the direction of the wireless electricity reception device 7.

Furthermore, the charging unit 78 is provided in the wireless electricity reception device 7, and thus the charging unit 78 can be charged or discharged at any timing. For example, when an occupant is not present within the vehicle 1, an electric power can be transferred from the wireless electricity transmission device 5 to the wireless electricity reception device 7, and thus the wireless electricity reception device 7 can be charged. Furthermore, when there is an electric power supply request from the sensor or the like that is connected, and so on, the wireless electricity reception device 7 can supply an electric power to the sensor or the like using the electric power with which the charging unit 78 is charged.

Furthermore, the wireless electricity transmission device 5 can determine a situation of the seat (a slid state or a folded state) according to a position of the wireless electricity reception device 7 that is embedded in the seat (the front seat 3 or the rear seat 4), or a radio-wave intensity of a radio wave that is received from the wireless electricity reception device 7. Then, for example, based on a result of the determination of the situation of the seat, the ECU 6 can estimate whether or not an occupant is present, can determine whether or not the seat may be automatically moved, and so on.

Furthermore, an electric power or information is wirelessly transferred between the wireless electricity transmission device 5 and the wireless electricity reception device 7, and thus problems, such as a short circuit and a malfunction, that result from the movement of the movable portion (the front seat 3 or the rear seat 4) in a case where a wire is used such as an electric power cable or a communication harness, can be avoided.

An operation or an effect in a case where the wireless electricity transmission system according to the first embodiment is compared with JP 2009-292230A, JP 2013-162609A, and Pamphlet of International Publication No. WO 2016/129450 will be described below. First, in the technology in JP 2009-292230A, a plurality of RFID tags and a plurality of antennas, which are connected in series, are provided in a seat within a vehicle, and thus, although the seat moves, wireless communication with an ECU can be performed with any RFID tag and any antenna. However, in the technology in JP 2009-292230A, many RFID tags have to be used in order to possibly perform wireless communication, and an increase in the number of components leads to an increase in the number of malfunctions. Furthermore, the RFID tag can be used for the wireless communication, but cannot be used for transfer of a more amount of electric power due to specifications for the RFID tag. On the other hand, in the wireless electricity transmission system according to the present embodiment, there is no increase in the number of components because one wireless electricity reception device 7 may be sufficient for one electric component and electric power can be transferred by the wireless electricity transmission device 5 and the wireless electricity reception device 7. Because of this, such problems do not occur.

Furthermore, in the technology in JP 2013-162609A, the electric power is transferred using an electromagnetic coupling type without any contact with a swing door and a sliding seat of the vehicle. However, in the technology in JP 2013-162609A, a technique that uses a laser or a mechanical sensor for measuring opening and closing angles of a door is necessary, and this leads to a large increase in the size of a system. Furthermore, because there is a need for electrodes to face each other in the sliding seat, an amount of slide is limited by a seat surface length, and the freedom of arranging seats within a space in an internal compartment of a vehicle is reduced. On the other hand, in the wireless electricity transmission system according to the present embodiment, a relative positional relationship between the wireless electricity transmission device 5 and the wireless electricity reception device 7 can be determined with ease, and a factor that causes the freedom of arranging seats to be degraded is not present. Because of this, such problems do not occur.

Furthermore, in the technology in Pamphlet of International Publication No. WO 2016/129450, efficient electric power, which is directional, is wirelessly transferred to a factory automation (FA) apparatus that operates periodically. However, in the technology in Pamphlet of International Publication No. WO 2016/129450, it is assumed that the FA apparatus operates periodically, and thus the technology can not find application in a case of the seat of which an in-vehicle movement cannot be predicted, and or the like. On the other hand, in the wireless electricity transmission system according to the present embodiment, the relative positional relationship between the wireless electricity transmission device 5 and the wireless electricity reception device 7 that is provided in the seat or the like can be periodically determined at any timing. Because of this, such problems do not occur.

Second Embodiment

Next, a wireless electricity transmission system according to a second embodiment will be described. In the wireless electricity transmission system according to the second embodiment, unlike in the first embodiment, the query wave is not transmitted from the wireless electricity transmission device 5 to the wireless electricity reception device 7, and, in a case where the pilot signal is received from the wireless electricity reception device 7, the wireless electricity transmission device 5 calculates the direction of the wireless electricity reception device 7 based on an arrival direction estimation algorithm. The same matter that is the same as in the first embodiment is hereinafter suitably omitted (FIG. 1 is shared).

Figure 5:
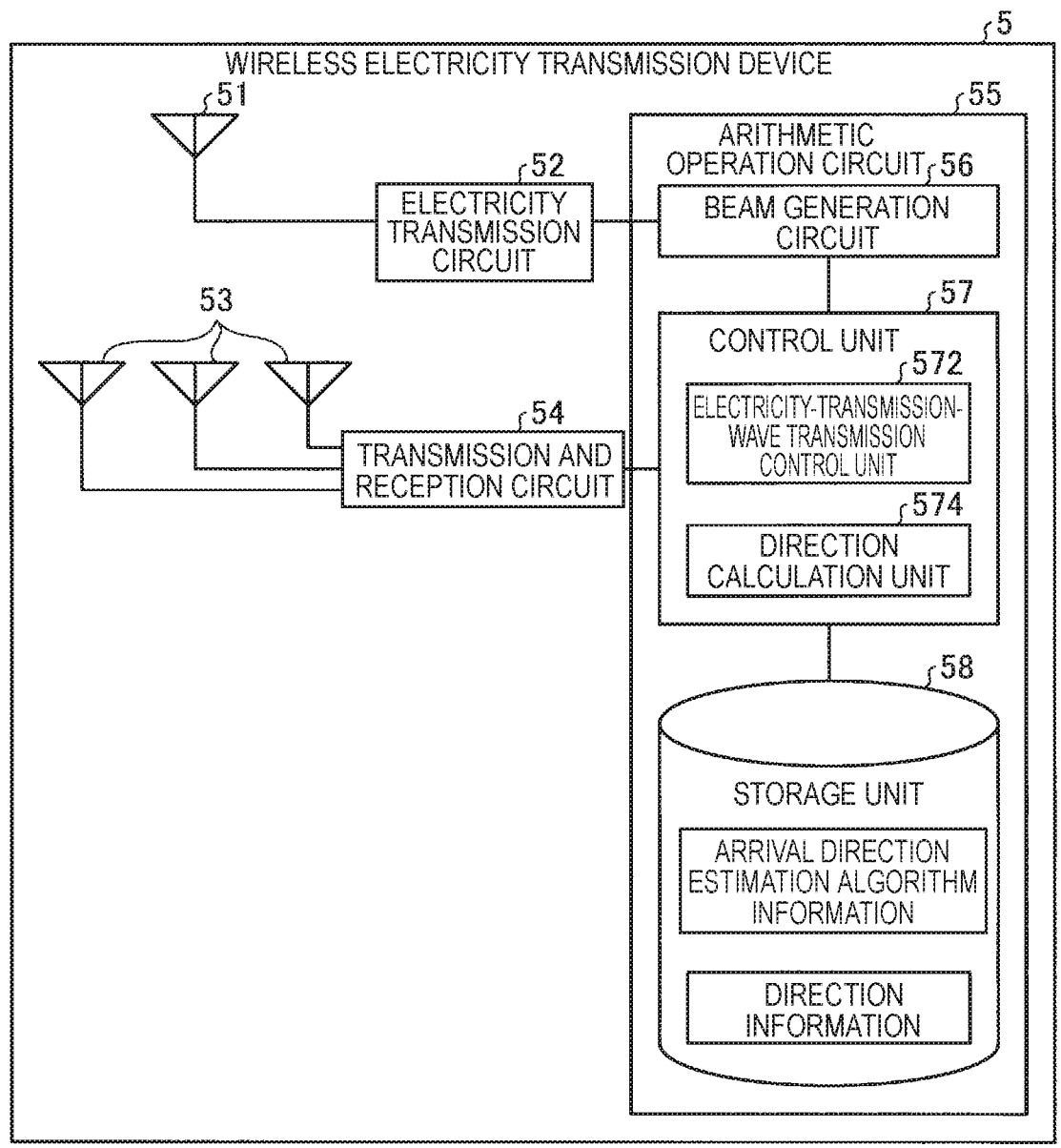
FIG. 5 is a diagram of a configuration of a wireless electricity transmission device according to a second embodiment.

A wireless electricity transmission device 5 according to the second embodiment is described with reference to FIG. 5. FIG. 5 is a diagram of a configuration of the wireless electricity transmission device 5 according to the second embodiment. When compared with the wireless electricity transmission device 5 in FIG. 2, the wireless electricity transmission device 5 in FIG. 5 is different in that a plurality of antennas 53 (for example, three antennas 53), not one antenna 53, are provided, in that the query wave transmission control unit 571 and the direction determination unit 573 are omitted from the control unit 57 and a direction calculation unit 574 is added, and in that arrival direction estimation algorithm information is stored in the storage unit 58.

The arrival direction estimation algorithm here is an algorithm for calculating (estimating) a direction in which a radio wave arrives, based on a difference in phase due to a difference in path length among radio waves, in a case where the radio waves are received by the plurality of antennas 53. Because the arrival direction estimation algorithm is already known, a further description thereof is omitted.

Based on the pilot signals from the wireless electricity reception device 7, which are received by the plurality of antennas 53, and on the arrival direction estimation algorithm that is stored in the storage unit 58, the direction calculation unit 574 calculates the direction of the wireless electricity reception device 7 that transmits the pilot signals. Furthermore, the electricity transmission wave transmission control unit 572 transmits the electricity transmission wave to the wireless electricity reception device 7 in the direction that is calculated by the direction calculation unit 574, using the beam generation circuit 56.

Figure 6:
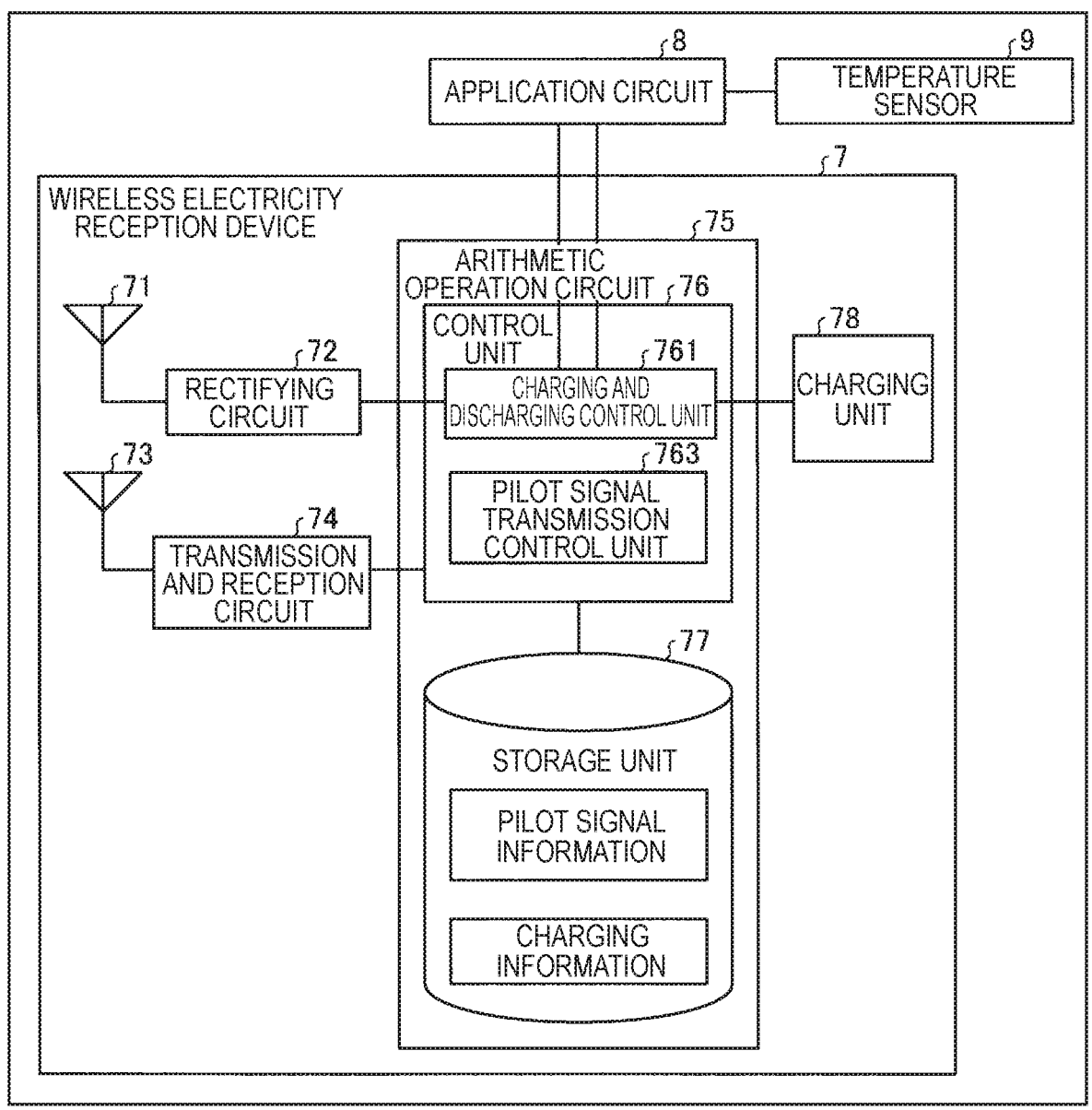
FIG. 6 is a diagram of a configuration of a wireless electricity reception device according to the second embodiment.

Next, a wireless electricity reception device 7 according to the second embodiment will be described with reference to FIG. 6. FIG. 6 is a diagram of a configuration of the wireless electricity reception device 7 according to the second embodiment. When compared with the wireless electricity reception device 7 in FIG. 3, the wireless electricity reception device 7 in FIG. 6 is different in that the reception strength determination unit 762 is omitted from the control unit 76 and in that the reception strength information is not stored in the storage unit 77.

Figure 7:
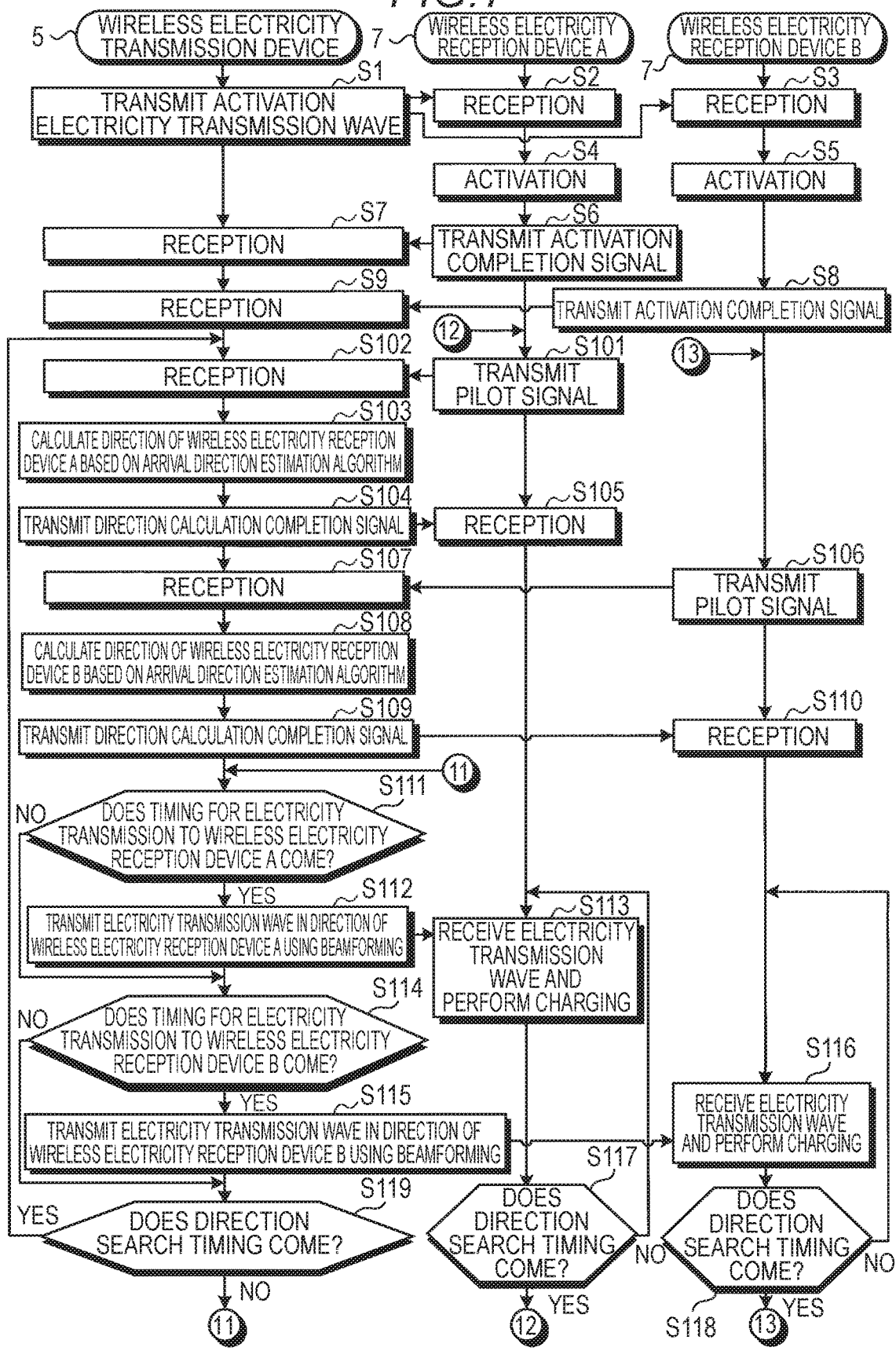
FIG. 7 is a flowchart illustrating processing by a wireless electricity transmission system according to the second embodiment.

Next, processing by the wireless electricity transmission system according to the second embodiment will be described with reference to FIG. 7. FIG. 7 is a flowchart illustrating the processing by the wireless electricity transmission system according to the second embodiment. It is noted that when compared with the flowchart in FIG. 4, the same processing is given the same step number and the description thereof is not suitably repeated.

Steps S1 to S9 are the same as those in FIG. 4. Subsequent to Step S9, in Step S101, the pilot signal transmission control unit 763 of the wireless electricity reception device A generates the pilot signal that includes identification information on the wireless electricity reception device A, using the transmission and reception circuit 74, and transmits the generated pilot signal from the antenna 73 to the wireless electricity transmission device 5. The wireless electricity transmission device 5 receives the pilot signal (Step S102).

Next, based on the pilot signals from the wireless electricity reception device A, which are received by the plurality of antennas 53, and on the arrival direction estimation algorithm that is stored in the storage unit 58, the direction calculation unit 574 of the wireless electricity transmission device 5 calculates the direction of the wireless electricity reception device A that transmits the pilot signals (Step S103).

Next, the control unit 57 of the wireless electricity transmission device 5 transmits a direction calculation completion signal to the wireless electricity reception device A (Step S104), and the wireless electricity reception device A receives the direction calculation completion signal (Step S105).

In the same manner, In Step S106, the pilot signal transmission control unit 763 of the wireless electricity reception device B generates the pilot signal that includes identification information on the wireless electricity reception device B, using the transmission and reception circuit 74, and transmits the generated pilot signal from the antenna 73 to the wireless electricity transmission device 5. The wireless electricity transmission device 5 receives the pilot signal (Step S107).

Next, based on the pilot signals from the wireless electricity reception device B, which are received by the plurality of antennas 53, and on the arrival direction estimation algorithm that is stored in the storage unit 58, the direction calculation unit 574 of the wireless electricity transmission device 5 calculates the direction of the wireless electricity reception device B that transmits the pilot signals (Step S108).

Next, the control unit 57 of the wireless electricity transmission device 5 transmits the direction calculation completion signal to the wireless electricity reception device B (Step S109), and the wireless electricity reception device B receives the direction calculation completion signal (Step S110).

Next, in Step S111, the control unit 57 of the wireless electricity transmission device 5 determines whether or not the timing for electricity transmission to the wireless electricity reception device A comes. The control unit 57 proceeds to Step S112 in the case where the result is Yes, and proceeds to Step S114 in the case where the result is No.

In step S112, the wireless electricity transmission device 5 transmits the electricity transmission wave using the beamforming in the direction of the wireless electricity reception device A. More precisely, when transmitting the electricity transmission wave to the wireless electricity reception device A, the electricity transmission wave transmission control unit 572 of the wireless electricity transmission device 5 transmits the directional electricity transmission wave, which is generated by the beam generation circuit 56, in the direction of the wireless electricity reception device A that is calculated by the direction calculation unit 574. Then, in the wireless electricity reception device A, the antenna 71 receives the electricity transmission wave, the rectifying circuit 72 rectifies the electricity transmission wave, and the charging and discharging control unit 761 charges the charging unit 78 with the direct current that results from the rectification (Step S113).

In Step S114, the control unit 57 of the wireless electricity transmission device 5 determines whether or not the timing for electricity transmission to the wireless electricity reception device B comes. The control unit 57 proceeds to Step S115 in the case where the result is Yes, and proceeds to Step S119 in the case where the result is No.

In step S115, the wireless electricity transmission device 5 transmits the electricity transmission wave using the beamforming in the direction of the wireless electricity reception device B. More precisely, when transmitting the electricity transmission wave to the wireless electricity reception device B, the electricity transmission wave transmission control unit 572 of the wireless electricity transmission device 5 transmits the directional electricity transmission wave, which is generated by the beam generation circuit 56, in the direction of the wireless electricity reception device B that is calculated by the direction calculation unit 574. Then, in the wireless electricity reception device B, the antenna 71 receives the electricity transmission wave, the rectifying circuit 72 rectifies the electricity transmission wave, and the charging and discharging control unit 761 charges the charging unit 78 with the direct current that results from the rectification (Step S116).

In Step S117, the control unit 76 of the wireless electricity reception device A determines whether or not the direction search timing comes. The control unit 76 returns to Step S101 in the case where the result is Yes, and returns to Step S113 in the case where the result is No. As the direction search timing, for example, the user may set any timing, such as a predetermined point in time every 30 minutes, a predetermined point in time every day, or a point in time immediately after an occupant get out of the vehicle 1 (the same is also true for the wireless electricity reception device B).

Furthermore, in Step S118, the control unit 76 of the wireless electricity reception device B determines whether or not the direction search timing comes. The control unit 76 returns to Step S106 in the case where the result is Yes, and returns to Step S116 in the case where the result is No.

Furthermore, in Step S119, the control unit 57 of the wireless electricity transmission device 5 determines whether or not the direction search timing comes. The control unit 57 returns to Step S102 in the case where the result is Yes, and returns to Step S111 in the case where the result is No.

In the manner, in the wireless electricity transmission system according to the second embodiment, the wireless electricity transmission device 5 transmits the directional electricity transmission wave in the direction that is calculated (estimated) based on the pilot signals from the wireless electricity reception device 7, which are received by the plurality of antennas 53, and on the arrival direction estimation algorithm, and thus can supply an electric power to each of the wireless electricity reception devices 7 with ease and with high efficiency.

Furthermore, while in the first embodiment, the direction from the wireless electricity transmission device 5 to the wireless electricity reception device 7 can be determined only with the accuracy of a shift angle (for example, by 5°) of the query wave that is transmitted from the wireless electricity transmission device 5, in the second embodiment, the direction from the wireless electricity transmission device 5 to the wireless electricity reception device 7 can be calculated with high accuracy by using the arrival direction estimation algorithm.

On the other hand, when compared with the wireless electricity transmission device 5 according to the second embodiment, the wireless electricity transmission device 5 according to the first embodiment has the advantage that the non-use of the arrival direction estimation algorithm results in decreasing an amount of arithmetic operation (an amount of electric power consumption).

The embodiments disclosed here are described, but the embodiments are provided as examples, without the intention of imposing a limitation on the scope of the present embodiment. Novel embodiments are possibly implemented in various other forms, and various omissions, substitutions, and modifications can be performed within the scope that does not depart from the gist of the embodiments disclosed here. Such embodiments and modifications to the embodiments fall within the scope or the gist of the embodiments disclosed here, and fall within the scope of the embodiments disclosed here that is claimed in each claim and the scope of an equivalent of the embodiments disclosed here.

For example, the number of wireless electricity reception devices 7 is not limited to 4, and is any number that is equal to or greater than 1.

Furthermore, the wireless electricity transmission device 5 is not limited to being installed underneath the floor 2, and may be installed on the ceiling or the like of the vehicle 1.

Furthermore, the wireless electricity reception device 7 is not limited to being installed in the seat, and may be installed in any other movable portion such as a door.

Furthermore, in FIG. 4, the wireless electricity reception device 7 is set to be activated by an activation transmission wave from the wireless electricity transmission device 5, but, without being limited to this, may wait to receive the query wave from the wireless electricity transmission device 5 using the electric power from the charging unit 78, with which the wireless electricity reception device 7 is charged in advance.

Furthermore, in FIG. 7, the wireless electricity reception device 7 is set to be activated by the activation transmission wave from the wireless electricity transmission device 5, but, without being limited to this, may transmit the pilot signal for the direction search to the wireless electricity transmission device 5, such as at a periodic timing, using the electric power from the charging unit 78, with which the wireless electricity reception device 7 is charged in advance.

Furthermore, in a case where the wireless electricity transmission device 5 receives the sensor information or the like from the wireless electricity reception device 7, a transmission destination of the sensor information or the like is not limited to the ECU 6, and may be any other device such as a vehicle-mounted car navigation system.

Furthermore, with the same technique as is used when the wireless electricity transmission device 5 recognizes (determines or calculates) the direction of the wireless electricity reception device 7, the wireless electricity reception device 7 may be set to recognize (determine or calculate) the direction of the wireless electricity transmission device 5. Then, if two results of the recognition are used, the accuracy of the direction is increased much more.

A wireless electricity transmission system according to an aspect of this disclosure is a wireless electricity transmission system that includes a wireless electricity transmission device and one or more wireless electricity reception devices, which are installed within a vehicle. The wireless electricity transmission device includes an electricity transmission wave generation unit that generates an electricity transmission wave that is directional, using beamforming, and a control unit that transmits a plurality of query waves in a plurality of directions within the vehicle and, when a pilot signal that includes identification information on a query wave that has a maximum reception strength is received from the wireless electricity reception device, transmits the electricity transmission wave to the wireless electricity reception device in a direction of the query wave that has the maximum reception strength using the electricity transmission wave generation unit. The wireless electricity reception device includes a reception strength determination unit that determines the query wave which has the maximum reception strength, among the plurality of query waves that are received from the wireless electricity transmission device, a control unit that transmits the pilot signal which includes the identification information on the query wave that has the maximum reception strength which is determined by the reception strength determination unit, to the wireless electricity transmission device, and a reception unit that receives the electricity transmission wave that is transmitted from the wireless electricity transmission device. With this configuration, for example, the wireless electricity transmission device transmits the directional electricity transmission wave in the direction of the query wave that has the maximum reception strength which is information that is included in the pilot signal which is received from the wireless electricity reception device, and thus an electric power can be supplied to the wireless electricity reception device with ease and with high efficiency.

A wireless electricity transmission system according to another aspect of this disclosure is a wireless electricity transmission system that includes a wireless electricity transmission device and one or more wireless electricity reception devices, which are installed within a vehicle. The wireless electricity reception device includes a control unit that transmits a pilot signal that includes identification information on the wireless electricity reception device itself, to the wireless electricity transmission device and a reception unit that receives an electricity transmission wave which is transmitted from the wireless electricity transmission device. The wireless electricity transmission device includes a plurality of antennas that receive the pilot signal which is transmitted from the wireless electricity reception device, an electricity transmission wave generation unit that generates the electricity transmission wave that is directional, using beamforming, and a control unit that calculates a direction of the wireless electricity reception device based on the pilot signal that is received by each of the plurality of antennas and on a predetermined arrival direction estimation algorithm, and transmits the electricity transmission wave to the wireless electricity reception device in the calculated direction using the electricity transmission wave generation unit. With this configuration, for example, the wireless electricity transmission device transmits the directional electricity transmission wave in the direction that is calculated based on the pilot signals from the wireless electricity reception device, which are received by the plurality of antennas, and on the predetermined arrival direction estimation algorithm, and thus can supply an electric power to the wireless electricity reception device with ease and with high efficiency.

In the wireless electricity transmission system described above, the control unit of the wireless electricity reception device may cause sensor information that is detected by a sensor which is connected to the wireless electricity reception device to be included in the pilot signal as attribute information, and transmit the pilot signal to the wireless electricity transmission device. With this configuration, for example, the wireless electricity reception device can cause the sensor information that is detected by the sensor that is connected to the wireless electricity reception device itself to be included in the pilot signal as the attribute information and transmit the pilot signal to the wireless electricity transmission device. Because of this, processing can be efficiently realized.

In the wireless electricity transmission system described above, the wireless electricity reception device may be installed in a movable portion within the vehicle. With this configuration, for example, even in a case where the movable portion in which the wireless electricity reception device is installed, moves, the electricity transmission wave can be transmitted in an accurate direction from the wireless electricity transmission device to the wireless electricity reception device.

In the wireless electricity transmission system described above, the wireless electricity reception device may supply an electric power at least one of a sensor, an ECU and a motor that is connected to the wireless electricity reception device itself. With this configuration, for example, specifically, the electric power can be supplied to at least one of the sensor, the ECU and the motor that is connected to the wireless electricity reception device.

In the wireless electricity transmission system described above, the wireless electricity reception device may further include a charging unit that is charged using the electricity transmission wave that is received by the reception unit. With this configuration, for example, the wireless electricity reception device can perform charging or discharging on the charging unit at any timing.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A wireless electricity transmission system comprising:
a wireless electricity transmission device and
one or more wireless electricity reception devices which are installed within a vehicle,
wherein the wireless electricity transmission device includes
an electricity transmission wave generation unit that generates an electricity transmission wave that is directional, using beamforming, and
a control unit that transmits a plurality of query waves in a plurality of directions within the vehicle and, when a pilot signal that includes identification information on a query wave that has a maximum reception strength is received from the wireless electricity reception device, transmits the electricity transmission wave to at least one of the one or more wireless electricity reception devices in a direction of the query wave that has the maximum reception strength using the electricity transmission wave generation unit, and
the wireless electricity reception device includes
a reception strength determination unit that determines the query wave which has the maximum reception strength, among the plurality of query waves that are received from the wireless electricity transmission device,
a control unit that transmits the pilot signal which includes the identification information on the query wave that has the maximum reception strength which is determined by the reception strength determination unit, to the wireless electricity transmission device, and
a reception unit that receives the electricity transmission wave that is transmitted from the wireless electricity transmission device.

2. The wireless electricity transmission system according to claim 1,
wherein the control unit of the wireless electricity reception device causes sensor information that is detected by a sensor which is connected to the wireless electricity reception device to be included in the pilot signal as attribute information, and transmits the pilot signal to the wireless electricity transmission device.

3. The wireless electricity transmission system according to claim 1,
wherein the wireless electricity reception device is installed in a movable portion within the vehicle.

4. The wireless electricity transmission system according to claim 1,
wherein the wireless electricity reception device supplies an electric power at least one of a sensor, an ECU and a motor that is connected to the wireless electricity reception device itself.

5. The wireless electricity transmission system according to claim 1,
wherein the wireless electricity reception device further includes a charging unit that is charged using the electricity transmission wave that is received by the reception unit.

* * * * *